Oct. 21, 1941.    C. C. LEVY    2,259,958
ELECTRODE CONTROL SYSTEM
Filed Feb. 21, 1940    2 Sheets-Sheet 1

WITNESSES:
E. A. McCloskey
F. V. Giolma

INVENTOR
Cyril C. Levy
BY
G. M. Crawford
ATTORNEY

Oct. 21, 1941.　　　　C. C. LEVY　　　　2,259,958
ELECTRODE CONTROL SYSTEM
Filed Feb. 21, 1940　　　　2 Sheets-Sheet 2

WITNESSES:
E. A. M'Closkey
G. V. Giolma

INVENTOR
Cyril C. Levy.
BY
Crawford
ATTORNEY

Patented Oct. 21, 1941

2,259,958

UNITED STATES PATENT OFFICE 2,259,958

ELECTRODE CONTROL SYSTEM

Cyril C. Levy, Pittsburgh, Pa., assignor to Westinghouse Electric & Manufacturing Company, East Pittsburgh, Pa., a corporation of Pennsylvania Application February 21, 1940, Serial No. 320,122

13 Claims. (Cl. 13—13)

My invention relates, generally, to control systems, and it has reference, in particular, to control systems for movable electrodes.

Generally stated, it is an object of my invention to provide an improved control system for movable electrodes which will be readily responsive to changes in the conditions of an associated electrode circuit for maintaining predetermined circuit conditions.

More specifically, it is an object of my invention to provide for automatically controlling the movement of an electrode by electric discharge means responsive to both current and voltage conditions of the electrode circuit.

Another object of my invention is to provide for controlling the direction and rate of feed of a movable electrode by electric discharge means responsive to the differential between voltages proportional to current and voltage conditions of the electrode circuit and a substantially constant control voltage so as to control the power of the electrode circuit.

A further object of my invention is to provide for controlling a movable electrode to maintain predetermined current and voltage conditions in an electrode circuit.

An important object of my invention is to provide for controlling the feed of a movable electrode by grid-controlled electric discharge means responsive to a control voltage which is the resultant of the differential between electromotive forces responsive to current and voltage conditions in the electrode circuit, and a substantially constant control voltage.

Still another object of my invention is to provide a simple and inexpensive electric discharge control system for a movable electrode which may be readily manufactured and easily maintained.

Other objects will, in part, be obvious and will, in part, appear hereinafter.

In practicing my invention, a movable electrode, such as used in an arc furnace, an arc-welding system, or the like, may be provided with suitable actuating means for feeding the electrode in opposite directions to strike and maintain an arc in an associated electrode circuit. In order to provide a highly responsive control system for the movable electrode, the operation of the actuating means may be controlled by electric discharge means, the conductivity of which may be controlled by means of control grids. For this purpose, means may be provided for producing variable, opposed electromotive forces responsive to current and voltage conditions of the electrode circuit, and a control electromotive force which is substantially constant. By applying these electromotive forces to the control grids of the electric discharge means in a suitable manner, the operation of the actuating means may be accurately controlled in accordance with the current and voltage conditions of the electrode circuit, for striking and maintaining an electric arc under predetermined conditions and maintaining a predetermined power input to the arc.

For a more complete understanding of the nature and scope of my invention, reference may be had to the following detailed description, which may be taken in connection with the accompanying drawings, in which.

Figure 1:
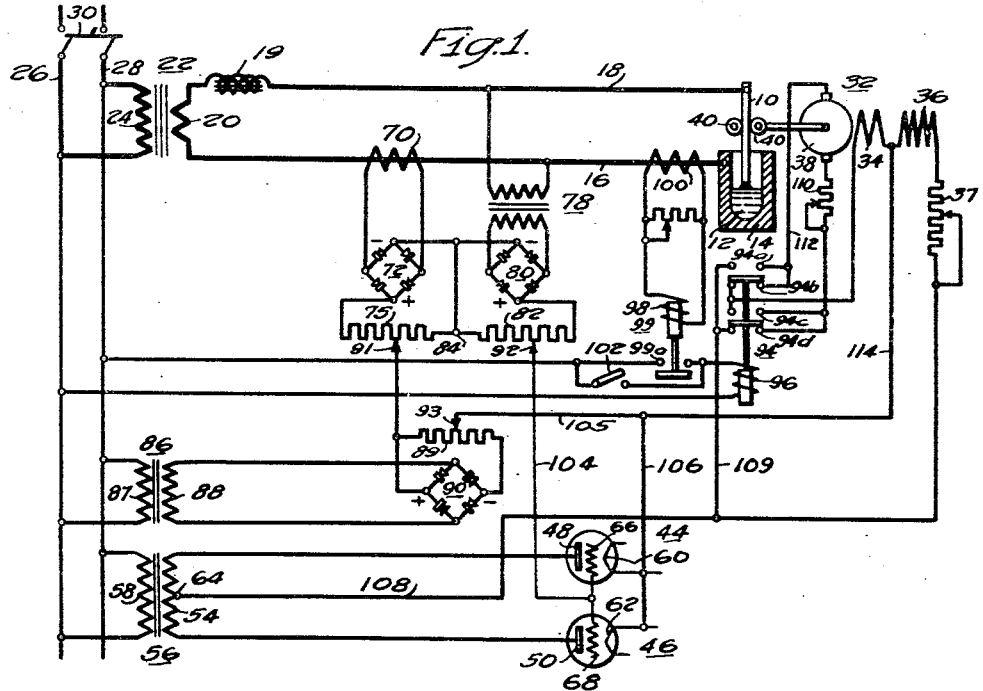
Figure 1 is a diagrammatic view of a movable electrode control system embodying the principal features of the invention.

Referring particularly to Fig. 1 of the drawings, the reference numeral 10 may denote generally a movable electrode adapted to strike and maintain an electric arc with the work 12, which may, for example, be positioned in the cupola 14 of an electric furnace for the purpose of being melted.

The electrode 10 may be connected to a suitable source of electric power by means of an electrode circuit comprising the conductors 16 and 18, a stabilizing reactor 19, and the secondary winding 20 of a power transformer 22, the primary winding 24 of which may be connected to a suitable alternating-current source by means of the conductors 26 and 28. Suitable means, such as the switch 30, may be provided for disconnecting the transformer 22 from the source to deenergize the electrode circuit, and for also deenergizing the control system.

The electrode 10 may be provided with suitable actuating means for feeding it towards and away from the work 12, such as, for example, the reversible electrode feed motor 32, having a series field winding 34 and a shunt field winding 36 provided with a rheostat 37 for varying the field current as desired. The armature 38 of the feed motor 32 may be operatively connected for feeding the electrode 10 in any suitable manner, such as by means of the feed rolls 40 which engage the electrode.

With a view to automatically controlling the rate of electrode feed, suitable means may be provided for controlling the energization of the feed motor 32, such as, for example, the electric discharge devices 44 and 46. For example, the electric discharge devices 44 and 46 may be connected in opposed relation intermediate to a suitable source of alternating current and the motor 32, in a well-known manner for rectifying both halves of the alternating current wave and supplying a unidirectional current to the motor 32. Thus, the anodes 48 and 50 of the electric discharge devices 44 and 46, respectively, may be connected to the terminals of the secondary winding 54 of a transformer 56, the primary winding 58 of which may be connected to a source of alternating current by the supply conductors 26 and 28. The cathodes 60 and 62 of the discharge devices may be energized in any manner well-known in the art, and connected to one side of the armature 38, the other side thereof being connected to a center tap 64 of the secondary winding 54 to provide an energizing circuit for the motor 32.

In order to control the value of the current supplied to the motor 32 through the discharge devices 44 and 46, the control grids 66 and 68 thereof may be connected together and energized in accordance with current and voltage conditions of the electrode circuit. For this purpose, a current transformer 70 having its primary winding connected in the electrode circuit may be provided for applying to suitable rectifying means, such as the rectifying bridge circuit 72, a voltage which is responsive to the current in the electrode circuit. The direct-current terminals of the bridge circuit 72 may be connected to a control resistor 75, so as to apply thereto the said direct-current voltage.

Suitable means, such as the potential transformer 78, which is energized from the electrode circuit, may be utilized in connection with rectifying means such as the rectifying bridge circuit 80, for applying to a control resistor 82 a direct current voltage which is responsive to voltage conditions in the electrode circuit. The control resistors 75 and 82 may be connected to a common terminal 84 so that the voltages impressed across the resistors are in opposition. Means may also be provided for producing a substantially constant control bias voltage, such as, for example, the control transformer 86, having a primary winding 87 connected to the supply conductors 26 and 28, and a secondary winding 88 connected to a control resistor 89 through a rectifier circuit 90.

The resistors 75, 82 and 89 may then be connected to apply a control voltage to the grids 66 and 68. The control resistor 89 may, for example, be connected in series circuit relation with the control resistors 82 and 75, so that the voltages of the control resistors 89 and 82 are additive, for applying a control voltage between the control and the cathodes 60 and 62 of the discharge devices. Movable contact members 91, 92 and 93 may be employed for making contact with the control resistors 75, 82 and 89 so that the resultant voltage applied to the control grids renders the discharge devices sufficiently conductive when the current and voltage of the arc are of the proper value, to maintain a predetermined rate of feed of the electrode 10 towards the work.

Changing current and voltage conditions vary the voltages across the resistors 75 and 89 in opposite senses, so that the differential therebetween is normally proportional to the power in the electrode circuit and is also particularly sensitive to changes of current and voltage in the electrode circuit. If the length of the arc increases from the normal value the differential is additive with respect to the voltage of the resistor 89. When the arc-length decreases, the differential becomes negative with respect to the voltage of the control resistor 89.

In order to provide for reversing the direction of electrode feed, suitable means may be utilized for reversing the connections of the armature 38 to the electric discharge devices 44 and 46, such as, for example, the reversing switch 94, which is provided with an operating winding 96, normally open contact members 94a and 94c, and normally closed contact members 94b and 94d.

With a view to providing for automatically reversing the direction of electrode feed, the operation of the reversing switch 94 may be controlled in accordance with current conditions in the electrode circuit. For example, the operating winding 96 of a current responsive control relay 99 may be energized in accordance with the current in the electrode circuit by means of a current transformer 100, for effecting the energization of the operating winding 96 of the reversing switch 94 when the current in the electrode circuit exceeds a predetermined value. A manually operable control switch 102 may also be provided for controlling the energization of the operating winding 96 so that the feed motor 32 may be reversed at the will of the operator, when desired.

In operation, the switch 30 may be closed to connect the power transformer 22 to the source and effect the energization of the control transformers 56 and 86. Since there is no current flowing in the electrode circuit at this time, there is no voltage across the control resistor 75. The full secondary voltage of the electrode circuit is impressed on the potential transformer 78 so that the voltage across the control resistor 82 is a maximum. A voltage, which is the sum of the voltages across the control resistors 82 and 89 is, accordingly, applied to the control grids 66 and 68 of the discharge devices 44 and 46 through the circuit extending from the control grids 66 and 68 through conductor 104, movable contact 92, control resistor 82, control resistor 75, movable contact 91, control resistor 89, movable contact 93, conductor 105, and conductor 106 to the cathodes 60 and 62. The control grids 66 and 68 are, therefore, made positive with respect to the cathodes 60 and 62, and the discharge devices 44 and 46 are thereby alternately rendered conductive when their anodes are positive with respect to their cathodes. A fully rectified direct current is thus supplied to the field windings and armature of the feed motor 32 through the circuit extending from the center tap 64 of the control transformer 56, conductor 108, conductor 109, contact members 94d of the reversing switch 94, current limiting resistor 110, armature 38, conductor 112, contact members 94b, series field winding 34, conductor 114, conductor 106, cathodes 60 and 62, and anodes 48 and 50 of the discharge devices 44 and 46, respectively, back to the terminals of the secondary winding 54. The shunt field winding 36 is also thereby energized through conductor 108, rheostat 37, field winding 36 and conductor 114. The feed motor 32 then operates to feed the electrode 10 in the direction of the work 12 at a relatively high speed, as the voltage applied to the control grids 66 and 68 is a maximum.

Upon the engagement of the electrode 10 with the work 12, a relatively large current flows in the electrode circuit, so that the current responsive relay 99 operates to effect the energization of the operating winding 96 of the reversing switch 94 through the normally open contact members 99a. The forward operating circuit of the armature 38 is thereby interrupted by the opening of contact members 94b and 94d, and the reverse operating circuit completed through contact members 94a and 94c, so that the feed motor 32 reverses and withdraws the electrode 10 from the work 12, producing an arc.

With an increase of arc length the current in the electrode circuit decreases. Upon the reduction of the arc current to a predetermined value, the current responsive relay 99 returns to the deenergized position, so that the reversing switch 94 operates to reconnect the armature 38 for effecting forward feed of the electrode 10 towards the work 12.

With the flow of current in the electrode circuit, a voltage is produced across the control resistor 75 which opposes the voltages of the control resistors 82 and 89. As the arc voltage varies in the opposite sense to the arc current, the voltage across the control resistor 82 is reduced. The voltage applied to the control grids 66 and 68 and the current supplied to the feed motor 32 are reduced accordingly. The rate of electrode feed will then be reduced until the arc is of the proper length. At this point the voltages produced by the control resistors 75 and 82 may balance, so that the control voltage of the resistor 89 renders the discharge devices sufficiently conductive to feed the electrode 10 at a predetermined rate so as to maintain the arc.

When the arc becomes too short, the voltage across the resistor 75 increases and that of the resistor 82 decreases, so that the conductivity of the discharge devices 44 and 46 will be reduced in response to the changes in the arc conditions, so as to effect the operation of the feed motor 32 to decrease the rate of feed and reestablish the predetermined desired arc conditions. Likewise, when the arc becomes too long, the voltage across the resistors 75 and 82 varies in the opposite sense, so that the rate of feed of the electrode 10 is increased to reestablish the proper conditions.

Figure 2:
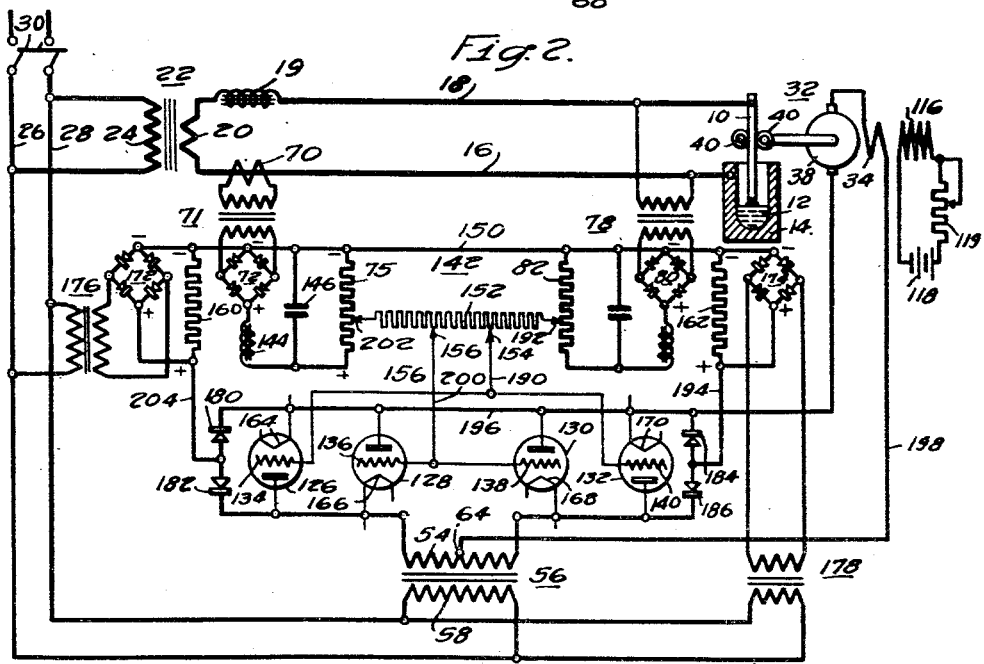
Fig. 2 is a diagrammatic view of a modification of the system of Fig. 1.

Referring particularly to Fig. 2 of the drawings, which illustrates a modification of the system of Fig. 1, the electrode 10 may be energized from a suitable source of alternating current by means of the transformer 22 in a similar manner to that illustrated in Fig. 1. The operation of the feed motor 32 may be controlled in accordance with both the current and voltage conditions of the electrode circuit to both vary the rate and direction of electrode feed in accordance with variations in those conditions.

With a view to controlling the rate and direction of electrode feed, the feed motor 32 may be provided with a separately excited field winding 116 which may be energized from a suitable source, such as, for example, the battery 118, through a suitable field rheostat 119, and the armature 38 of the feed motor may be energized from the secondary winding 54 of the transformer 56 having a center tap 64. Suitable means may be provided for controlling the value and direction of current flow through the armature 38, such as, for example, the electric discharge devices 126, 128, 130 and 132. The discharge device 126, 128 may be paired in inverse, parallel or anti-parallel relation and connected to one terminal of the transformer 56 and in series with the armature 38 and the center tap 64 of the secondary winding 54 of the control transformer 56, while the discharge devices 130 and 132 are similarly connected to the other terminal of the transformer.

In order to energize the control grids 134, 136, 138 and 140 of the discharge devices 126, 128, 130 and 132 for suitably controlling the conductivity of the discharge devices in accordance with current and voltage conditions in the electrode circuit, a control circuit 142 may be provided in which grid control voltages proportional to the current and voltage of the electrode circuit and substantially constant bias voltages are produced. To effect control of the electrode 10 in accordance with current conditions of the electrode circuit, a current transformer 70 having its primary winding energized from the electrode circuit may be connected by means of a transformer 71 to the alternating-current terminals of rectifying means such as the rectifying circuit 72, the direct-current terminals of which are connected across the control resistor 75 in the control circuit, so as to produce a current responsive control voltage. A potential transformer 78 having its primary winding connected to the electrode circuit may be connected to a rectifying circuit 80 for applying a voltage proportional to the voltage of the eelctrode circuit across control resistor 82 of the control circuit. The reactance 144 and condenser 146 may be connected to the rectifier circuits 72 and 80 to remove any ripple and vary the characteristics of the said circuits.

The control resistors 75 and 82 may be connected at one end by a control bus 150 and bridged by relatively high value control resistor 152 so that the voltage across the resistor 152 is the differential between the voltages of the resistors 75 and 82. The control grids 134 and 140 may then be connected to the control resistance 152 by an adjustable contact member 154, and the control grids 136 and 138 by a contact member 156 so that opposed control voltages may be impressed thereon to control the conductivity of the discharge devices.

A suitable negative bias may be applied to the grids of the discharge devices for rendering them non-conductive, by means of control resistors 160 and 162 in the control circuit, which may be connected at one end to the control bus 150 and at the other end to the cathodes 164 and 170 and 166 and 168, respectively, of the discharge devices. The resistors may be energized through suitable rectifier circuits 172 and 174 from control transformers 176 and 178, respectively. Rectifier devices 180, 182 and 184 and 186 may be connected in paired and opposed relation between the resistors 160 and 162 and the cathodes of the discharge devices, so as to effectively insulate the bias circuits of the discharge devices from the motor circuit and permit a substantially constant bias voltage of a predetermined polarity and value to be applied to the devices. Thus the discharge devices 126 and 132 may cooperate to fully rectify the alternating current impulses from the transformer 56 when the voltage of the grids 134 and 140 is of a predetermined value and polarity, and the discharge devices 128 and 130 may likewise cooperate when the voltage of the grids 136 and 138 is of a predetermined value and polarity to produce a direct current of the opposite polarity.

To energize the electrode circuit and effect operation of the electrode control system, the switch 30 is closed to connect the power transformer 22 to the source of alternating current and effect the energization of the control transformers 56, 176 and 178. Since the electrode circuit is open, the potential transformer 78 will be energized, so that a voltage appears across the control resistor 82, while none appears across the control resistor 75. Thus, a voltage is produced in the control circuit 142 which may be applied to the control grids 134 and 140 of the electric discharge devices 126 and 132 to overcome the negative bias voltage, through the circuit from the control grids 134 and 140, through conductor 190, movable contact 154, control resistor 152, contact member 192, control resistor 82, control bus 150, control resistor 162, conductor 194, rectifier device 184, and conductor 196, to the cathodes 170 and 164 of the discharge devices 132 and 126. The discharge devices 126 and 132 are thereby rendered alternately conductive on opposite halves of the alternating current wave to supply a fully rectified direct current to the armature 38 of the feed motor 32, through the circuit extending from alternate halves of the secondary winding 54, through the discharge devices 126 and 132, conductor 196, armature 38, series field winding 34, and conductor 198 to the center tap 64, so as to feed the electrode 10 towards the work 12.

Upon the engagement of the electrode 10 with the work 12, the voltage of the electrode circuit is greatly reduced, and a relatively large current flows therein. Accordingly, the voltage across the control resistor 82 is greatly reduced, while a relatively high voltage is produced across the control resistor 75. Thus the polarity of the differential voltage across the resistor 152 is reversed. The voltage applied to the control grids 134 and 140 becomes sufficiently negative so that the discharge devices 126 and 132 cease to conduct. At the same time a voltage is applied to the control grids 136 and 138 of the discharge devices 128 and 130 through the circuit extending from the control grids 136 and 138, through conductor 200, movable contact 156, control resistor 152, contact member 202, control resistor 75, control bus 150, and then through control resistor 160, conductor 204 and rectifier 182 to the cathode 166 of the discharge device 128, and resistor 162, conductor 194 and rectifier 186 to the cathode 168 of the discharge device 130. The discharge devices 128 and 130 are thus rendered alternately conductive to supply a direct current to the armature 38 of the feed motor 32 to operate the feed motor in the reverse direction and withdraw the electrode 10 from the work 12 so as to strike an arc.

Immediately after striking the arc, the current in the electrode circuit commences to decrease, while the voltage of the electrode circuit commences to increase. The voltage across the control resistor 152 and the voltages applied to the control grids 134, 140 and 136, 138 vary accordingly. The contact members 192 and 202 may be so adjusted that when predetermined arc conditions exist, the voltages across the control resistors 75 and 82 are equal, the voltage across the control resistor 152 is zero, and the discharge devices 126, 132 and 128, 130 are rendered nonconductive by means of the negative voltage bias applied to their control grids through the control resistors 160 and 162, so as to stop the electrode feed. By adjustment of the contact members 192 and 202, the voltage across the resistor may be varied, if desired, so as to render the discharge devices 126 and 132 sufficiently conductive to effect the operation of the feed motor 32 to feed the electrode 10 toward the work 12 at substantially the same rate at which the electrode is being consumed, when predetermined arc conditions exist in the electrode circuit.

Upon variations in the electrode circuit conditions from the predetermined desired conditions, the voltages impressed across the control resistors 75 and 82 also vary, and the value and the polarity of the voltage across the control resistor 152 vary accordingly. Thus, if the arc becomes shorter than a predetermined normal value, the current in the electrode circuit increases and the voltage of the electrode circuit decreases. The differential between the voltages of the control resistors 75 and 82 and the voltage across the control resistor 152 then becomes effective either to render the discharge devices 128 and 130 conductive to withdraw the electrode from the work so as to increase the length of the arc to the desired value, or to reduce the conductivity of the discharge devices 126 and 132 so as to reduce the rate of feed of the electrode toward the work, depending on the adjustment of the contact members 192 and 202.

If the length of the arc exceeds the predetermined normal value the voltage across the control resistor 82 increases, while the voltage across the control resistor 75 decreases, so that the differential voltage across the control resistor 152 varies in the opposite sense, and is of the opposite polarity. The discharge devices 128, 132 are then rendered conductive to feed the electrode 10 towards the work so as to shorten the length of the arc, or the conductivity thereof is increased, depending on the adjustment of the contact members 192 and 202. Depending on the degree of the variations in the arc length, the changes in the voltage across the control resistors 75 and 82 vary accordingly to effect corresponding changes in the conductivity of the discharge devices so as to vary the value of the direct current supplied to the feed motor and vary the rate of electrode feed to produce the desired arc conditions.

Figure 3:
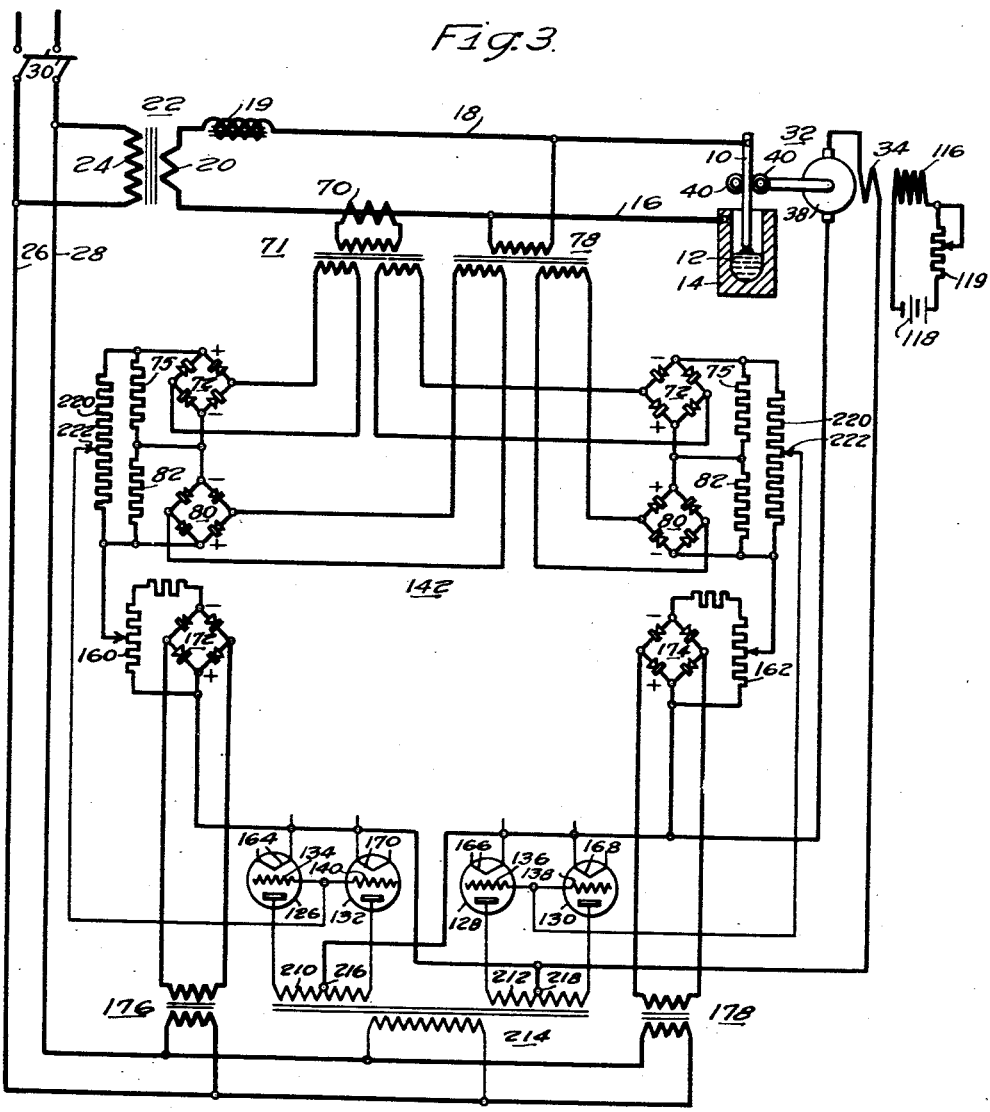
Fig. 3 is a similar view of a further modification.

Referring particularly to Fig. 3, which illustrates a modification of the control system illustrated in Fig. 2, the electric discharge devices 126, 132 and 128, 130 may be connected in paired relation in a well-known manner so as to provide for complete rectification of the alternating current from the separate secondary windings 210 and 212 of the control transformer 214, for controlling the operation of the feed motor 32 in opposite directions. For example, the windings 210 and 212 of the transformer 214 may be provided with center taps 216 and 218, respectively, and the armature 32 may be connected in series circuit relation between the center taps and the cathodes of the discharge devices associated with each winding so as to be energized from the windings 210 and 212 in opposite senses.

The control grids 134, 140 and 136, 138 of the respective pairs of discharge devices may be connected together, and separately energized from a control circuit 142 in the manner much similar to that hereinbefore described in connection with Fig. 2, so as to control the operation of the feed motor 32 to vary both the rate and direction of feed of the electrode 10 to strike and maintain an arc between the electrode and the work 12, as hereinbefore described in detail.

Instead of, however, utilizing a common source of variable control voltage, such as in the system shown in Fig. 2, separate sources may be provided for the control circuit 142 so as to more completely isolate the grid circuits of the different pairs of discharge devices from each other. The potential transformer 78 may be provided with a split secondary winding, each section being connected to a rectifier circuit 80. Similarly, the current transformer 70 may be connected to a step-up transformer 71 having a split secondary winding, each section of which is connected to a rectifier circuit 72. Control resistors 75 and 82 may be connected in bridge relation across the respective pairs of rectifier circuits 72 and 80 as in Fig. 2. Control resistors 220 may be connected across the respective pairs of resistors 75 and 82 to provide an adjustable connection from the respective pairs of grids. Separate sources of bias potential, such as the resistors 160 and 162, which may be energized from control transformers 176 and 178 through rectifier circuits 172 and 174, may also be provided for applying a negative bias voltage to the grids 134 and 140 and 136 and 138 respectively, to render the discharge devices non-conductive.

The operation of the control system of Fig. 3 is otherwise substantially the same as that of the system of Fig. 2, which has been described in detail. The pairs of discharge devices 126, 132 and 128, 130 may be selectively rendered conductive or non-conductive to control the feed motor 32 so as to feed the electrode 10 in either direction or hold it stationary, depending on both the current and voltage conditions of the arc circuit, and the relative adjustment of the contact members 222 on the respective resistors 220.

In view of the foregoing description, it will be apparent that I have provided a simple and effective control system for a movable electrode. Both the rate and direction of electrode feed may be readily controlled in accordance with conditions in the electrode circuit. Since the current and voltage conditions in an electrode circuit for maintaining an arc normally vary in the opposite directions, by controlling the rate of electrode feed in response to variations in both the current and voltage conditions of the electrode circuit, a highly sensitive control system is obtained. Control of the arc may be had to maintain a predetermined power in the electrode circuit in this manner. By utilizing electrode feed motor control means of the electric discharge type, control of the feed motor in response to the current and voltage changes may be readily and accurately secured. Thus, I have, by my invention, provided a simple and inexpensive method of accurately controlling the rate of electrode feed which may be readily effected and inexpensively maintained.

Since certain changes may be made in the above description, and different embodiments of the invention may be made without departing from the spirit thereof, it is intended that all matter shown in the accompanying drawings or contained in the above description shall be considered as illustrative, and not in a limiting sense.

I claim as my invention:

1. A movable electrode system comprising, a movable electrode having an energizing circuit therefor, a feed motor operatively connected to the electrode, means for producing a substantially constant electromotive force, means for producing an electromotive force responsive to current conditions in the electrode energizing circuit, means for producing an electromotive force responsive to voltage conditions of the electrode energizing circuit, control means having a control electrode controlled by applying a voltage to said control electrode thereof for controlling the operation of the feed motor, and circuit means for producing a resultant of the electromotive forces and applying it to the control electrode, said voltage responsive voltage opposing the current responsive voltage to render the control means conductive.

2. The combination with a movable electrode of actuating means for the electrode, an energizing circuit for the electrode, means for producing an electromotive force proportional to the current in the energizing circuit, means for producing an opposing electromotive force responsive to voltage conditions of the energizing circuit, means for producing a substantially constant electromotive force, a control circuit so connecting the said means that the current and voltage responsive electromotive forces are in opposed relation, electric discharge means for controlling the operation of the said actuating means, and circuit means for applying the resultant of said electromotive forces to the electric discharge means.

3. The combination with a work circuit for supplying electrical energy to a movable member, of actuating means operatively connected for feeding the member, means for producing a voltage proportional to the voltage of the work circuit, means for producing a voltage proportional to the current in the work circuit, means for producing a substantially constant voltage, a plurality of electrode controlled electric discharge devices connected for controlling the energization of the actuating means, and circuit means for superimposing the said voltages with the current responsive voltage opposing the others and applying the resultant to the electrodes of the discharge devices.

4. An electrode control system comprising a movable electrode, actuating means for the electrode, an electrode circuit, means for producing an electromotive force in response to a voltage condition in the electrode circuit, means for producing an electromotive force in response to a current condition in the electrode circuit, means for producing a substantially constant electromotive force, electric discharge means having control electrodes controlled by applying an electromotive force to said control electrodes operable to control the operation of the actuating means to regulate the rate and direction of electrode feed, and a control circuit for producing a resultant of the said electromotive forces and applying it to the control electrode.

5. The combination with a movable electrode having reversible electrode actuating means and an electrode circuit for connecting the electrode to a source of energy, of means for producing a voltage proportional to the voltage of the electrode circuit, means for producing a voltage proportional to the current in the electrode circuit, means including an electric discharge device having a control electrode for controlling the actuating means to vary the rate and direction of electrode feed, and circuit means for applying the said voltages to the control electrode in opposed relation.

6. An electrode feed control for a movable electrode having an energizing circuit and reversible actuating means for feeding the electrode to strike and maintain an arc with work comprising, means including grid controlled electric discharge means for controlling the operation of the actuating means, means for producing a voltage proportional to the arc current, means for producing an opposing voltage proportional to the voltage between the electrode and the work, means for producing a substantially constant voltage, and circuit means for applying the said voltages to the grid of the electric discharge means so that the voltage responsive and substantially constant voltages oppose the current responsive voltage and tend to effect feed of the electrode toward the work to control the rate and direction of feed of the electrode.

7. The combination with apparatus including a movable member, reversible actuating means operatively connected to the member, and a work circuit for connecting the member to a source of electrical power, of electric discharge means including a control electrode for controlling the operation of the actuating means in one direction, additional electric discharge means including a control electrode for controlling the operation of the actuating means in the opposite direction, means for producing a voltage responsive to current conditions in the work circuit, means for producing an opposing voltage responsive to voltage conditions of the work circuit, means for producing a substantially constant control voltage, and means for superimposing said voltages on the control electrodes with the current and voltage responsive voltages in opposed relation for controlling the electric discharge devices in response to the resultant of the said voltages.

8. The combination with a movable electrode having actuating means and an electrode circuit in which it is adapted to strike and maintain an arc, of means for producing an electromotive force responsive to the current in the electrode circuit, means for producing an opposing electromotive force responsive to a voltage condition of the electrode circuit, means for producing a substantially constant electromotive force, electric discharge means having control electrodes for controlling the energization of the actuating means connected between the actuating means and a source of alternating current, circuit means connecting the voltage producing means to the control electrodes for controlling the rate of operation of the actuating means, said current responsive voltage opposing the others and tending to render the discharge means non-conductive, and control means responsive to current conditions in the electrode circuit for controlling the connections between the discharge means and the actuating means to control the direction of operation of the actuating means.

9. An electrode system comprising, a movable electrode member, a reversible feed motor operatively connected to the electrode member, an electrode circuit for connecting the electrode to a source of alternating current, grid-controlled electric discharge means for controlling the energization of the feed motor, electro-responsive means operable in response to predetermined current conditions in the electrode circuit to control the connection of the feed motor to the grid controlled discharge means so as to vary the direction of electrode feed, a control circuit for energizing the grid of the discharge means to control the output thereof, means for producing in the control circuit a direct current voltage responsive to current conditions in the electrode circuit, means for producing in the control circuit an opposing direct current voltage responsive to voltage conditions in the electrode circuit, and means for producing in the control circuit a voltage of a value sufficient to maintain a predetermined rate of electrode feed when the current and voltage conditions of the electrode circuit are of a predetermined value.

10. An electrode control system for a movable electrode having a feed motor operatively connected therewith and an electrode circuit for supplying electrical energy thereto comprising, means for producing a direct current electromotive force proportional to the current in the electrode circuit, means for producing an opposing direct-current electromotive force proportional to the voltage of the electrode circuit, means for producing a substantially constant direct current electromotive force, an energizing circuit for connecting the feed motor to a source of alternating current, electric discharge means having a control electrode operable to control the flow of current in the energizing circuit in one direction, additional electric discharge means having a control electrode operable to control the flow of current in the energizing circuit in the opposite direction, and circuit means for applying said electromotive forces to the control electrodes with the current and voltage electromotive forces in opposed relation for controlling the operation of the electric discharge means in accordance with the resultant of the electromotive forces to control the direction and rate of electrode feed.

11. A control system for a movable electrode having a feed motor operatively connected therewith and an electrode circuit for energizing the electrode comprising, electric discharge means for connecting the feed motor to a source of electrical energy provided with a control grid for controlling the flow of current therethrough in one direction, additional electric discharge means for connecting the feed motor to the source of electrical energy provided with a control grid for controlling the current flow therethrough in the opposite direction, a control circuit, means for producing in the control circuit a direct current voltage responsive to differential between current and voltage conditions of the electrode circuit, means for producing in the control circuit a substantially constant direct current control voltage, and means for connecting the control circuit to the control grids to vary the magnitude and direction of flow of the feed motor current.

12. The combination with a movable electrode having reversible actuating means and an electrode circuit for connecting it to a source of current, of electric discharge means for controlling the operation of the actuating means in one direction, additional electric discharge means for controlling the operation of the actuating means in the opposite direction, control means associated with the electric discharge means to selectively render the discharge means conductive and vary the magnitude of the current flow therethrough, means for producing a voltage responsive to voltage conditions of the electrode circuit, means for producing an opposing voltage responsive to current conditions in the electrode circuit, means for producing a substantially constant control voltage, circuit means for superimposing said voltages in opposed relation and means for applying the resultant of the said voltages to the control means to effect operation of the actuating means to feed the electrode in one direction at a predetermined speed under normal current and voltage conditions in the electrode circuit and vary the speed and direction of electrode feed in response to variations in the circuit conditions of the electrode circuit.

13. In a control system for an electrode having an associated electrode circuit, in combination, a reversible feed motor, a pair of electrode controlled electric discharge devices connected for energizing the feed motor to operate in one direction, an additional pair of electrode controlled electric discharge devices connected for energizing the feed motor to operate in the other direction, means for producing a variable voltage responsive to the voltage of the electrode circuit, additional means for producing a substantially constant bias voltage, circuit means for applying said voltages in opposed relation to the electrodes of the first-mentioned pair of discharge devices for controlling the conductivity of the first-mentioned pair of discharge devices to effect feed of the electrode in one direction, means for superimposing a separate bias potential and a variable voltage responsive to the current in the electrode circuit in opposed relation, and circuit means to apply the resultant voltage to the electrodes of the said additional pair of discharge devices for controlling the conductivity of the additional pair of discharge devices in opposition to that of the first-mentioned pair.

CYRIL C. LEVY.